US012092157B1

(12) United States Patent
Lu et al.

(10) Patent No.: US 12,092,157 B1
(45) Date of Patent: Sep. 17, 2024

(54) MAGNETIC PRELOADING AIR BEARING AND LINEAR PLATFORM HAVING SAME

(71) Applicant: WUXI XIVI SCIENCE AND TECHNOLOGY CO., LTD., Wuxi (CN)

(72) Inventors: Minjie Lu, Wuxi (CN); Yanyan Jiang, Wuxi (CN)

(73) Assignee: WUXI XIVI SCIENCE AND TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/648,385

(22) Filed: Apr. 28, 2024

Related U.S. Application Data (63) Continuation of application No. PCT/CN2024/079807, filed on Mar. 4, 2024.

(30) Foreign Application Priority Data

Oct. 19, 2023 (CN) .......................... 202311353096.5

(51) Int. Cl.
*F16C 32/06* (2006.01)
*F16M 11/04* (2006.01)

(52) U.S. Cl.
CPC ....... *F16C 32/0614* (2013.01); *F16M 11/043* (2013.01)

(58) Field of Classification Search
CPC .. F16C 32/06; F16C 32/0603; F16C 32/0614; F16C 32/0622; F16M 11/043
See application file for complete search history.

(56) References Cited

U.S. PATENT DOCUMENTS

| 2001/0021283 A1 | 9/2001 | Kusunoki |
| 2002/0048416 A1 | 4/2002 | Binnig et al. |
| 2006/0251344 A1 | 11/2006 | Weis |
| 2008/0198485 A1* | 8/2008 | Kosmowski ....... B23K 26/0876 359/811 |

(Continued)

FOREIGN PATENT DOCUMENTS

| CN | 214393211 U | 10/2021 |
| CN | 112032199 B * | 3/2022 ............... B64G 7/00 |
| CN | 114483786 A * | 5/2022 |

(Continued)

*Primary Examiner* — Alan B Waits
(74) *Attorney, Agent, or Firm* — True Shepherd LLC; Andrew C. Cheng (57) ABSTRACT

A magnetic preloading air bearing comprises an air floating substrate, a plurality of preloading assemblies are disposed around the air floating substrate, an annular air floating structure extends and protrudes at one side of the air floating substrate, a shunt assembly is disposed inside the air floating substrate, a lateral of the shunt assembly is disposed corresponding to an inner side of the air floating structure, an air inlet channel penetrates and extends at the other side of the air floating substrate, and the air inlet channel is disposed corresponding to the shunt assembly; and the preloading assembly is connected to the air floating substrate through a fixing rod. The present disclosure aims to provide the magnetic preloading air bearing that has high stability and high precision and is not prone to an air hammer phenomenon, and the linear platform having the bearing.

8 Claims, 11 Drawing Sheets

(56) References Cited

U.S. PATENT DOCUMENTS

2020/0217364 A1* 7/2020 Maamari ............. F16C 32/0607
2024/0167616 A1* 5/2024 Zihlmann .......... F16M 11/2085

FOREIGN PATENT DOCUMENTS

| CN | 116857284 A |   | 10/2023 |
| CN | 117072560 A | * | 11/2023 |
| KR | 102427693 B1 | * | 8/2022 |

* cited by examiner

MAGNETIC PRELOADING AIR BEARING AND LINEAR PLATFORM HAVING SAME

CROSS-REFERENCE TO RELATED APPLICATIONS

This application is a continuation of International Patent Application No. PCT/CN2024/079807 with a filing date of Mar. 4, 2024, designating the United States, now pending, and further claims priority to Chinese Patent Application No. 202311353096.5 with a filing date of Oct. 19, 2023. The content of the aforementioned applications, including any intervening amendments thereto, are incorporated herein by reference.

TECHNICAL FIELD

The present disclosure belongs to the technical field of precision instruments, and in particular relates to a magnetic preloading air bearing and a linear platform having the same.

BACKGROUND ART

An air bearing is a sliding bearing that takes air as a lubricant. In normal operation, a shaft and a surface of the bearing are completely isolated by an air film, and a pressure in the air film changes to support the shaft and an external load. To obtain large stiffness of the air bearing, a large load or preload is generally required. Especially for a lateral air bearing, only an extra preload can be used. Common preloading methods include vacuum preloading and magnetic preloading. The use of the vacuum preloading has harsh conditions with a relatively small preloading force, such that the magnetic preloading is generally used to load the air bearing.

In the prior art, the Disclosure U.S. Pat. No. 4,128,280A, entitled "SELF-PRESSURIZED FLOATING AIR BEARING HAVING MAGNETIC BEARING THEREIN", describes a composite bearing including a self-pressurized floating air bearing and a permanent magnetic bearing. The permanent magnetic bearing is used to support a bearing body in a relationship isolated from a support body at least during start-up of the bearing body from a static state to descending of the bearing body to a static position. The bearing may be configured as a radial bearing or a thrust bearing. The permanent magnetic bearing may be located inside or outside the air bearing. The bearing of this disclosure has slightly low stability.

SUMMARY OF THE INVENTION

An object of the present disclosure is to provide a magnetic preloading air bearing that has high stability and high precision and is not prone to an air hammer phenomenon, and a linear platform having the bearing.

To achieve the above object, the present disclosure adopts the following technical solution:
a magnetic preloading air bearing includes an air floating substrate, wherein a plurality of preloading assemblies are disposed around the air floating substrate, an annular air floating structure extends and protrudes at one side of the air floating substrate, an air inlet channel penetrates and extends at the other side of the air floating substrate, a shunt assembly is disposed inside the air floating substrate, a side edge of the shunt assembly is disposed corresponding to an inner side of the air floating structure, and the air inlet channel is disposed corresponding to the shunt assembly; and the preloading assembly is connected to the air floating substrate through a fixing rod.

According to an embodiment of the present disclosure, the air floating structure adopts a porous throttle material.

With the overall arrangement of the magnetic preloading air bearing, an external air source will enter the air floating substrate through the air inlet channel, and the air conveyed in the air inlet channel will enter the shunt assembly. The shunt assembly is used to achieve air shunt in two directions, one direction faces the air floating structure, and the other direction faces an air floating guide rail. The air floating structure adopts the porous throttle material comprising a solid matrix and interconnected pores therein, the air will be throttled by the porous throttle material and flow between the porous throttle material and the air floating guide rail, and an air film is formed between the porous throttle material and the air floating guide rail to achieve suspension of the air floating guide rail and the porous throttle material. Since the air floating structure is an annular structure protruding from a side of the air floating substrate, a groove may be provided at a side of the air floating substrate, that is, the shunt assembly discharges the air toward the air floating guide rail in the groove, thereby maintaining an air pressure and allowing the air pressure to have a certain elastic range. That is to say, when the external air source conveys the air and the air pressure fluctuates, the air may be stored and released in the groove to realize a stable pressure of the pressure fluctuation of the air in the groove and form the air film without affecting a thickness, thereby preventing the air hammer phenomenon. By disposing the shunt assembly, a plurality of air discharge directions may be formed to facilitate discharging the air to the outside and improving the smoothness of air discharge.

A plurality of preloading assemblies are disposed around the air floating substrate, a magnet is disposed on the preloading assembly, and the preloading assembly is used to cooperate with the air floating guide rail. That is, an adsorption strip or another magnetic adsorption device adapted to the preloading assembly is disposed in a position opposite to the air floating guide rail. When the magnetic preloading air bearing travels, there may be an unstable condition in an operation process of the magnetic preloading air bearing, for example, the air bearing shakes or slants, the preloading assemblies disposed around the air floating substrate assist in promoting the stability of the magnetic preloading air bearing during operation through magnetic adsorption, by forming an acting force with the air floating guide rail through magnetic adsorption. When the external air source stops supplying air, the disposed preloading assembly can be quickly adsorbed with the air floating guide rail to stop a movement of an air-bearing table, thereby reducing or avoiding a movement error and improving the response efficiency and speed of braking.

According to an embodiment of the present disclosure, a flow-buffering assembly is disposed at an end of the air inlet channel to cooperate with the shunt assembly. The flow-buffering assembly includes a first flow-buffering housing, the end of the air inlet channel penetrates through a top of the first flow-buffering housing, and a lateral of the first flow-buffering housing is surrounded by air holes; and a fixing barrel is coaxially disposed inside the first flow-buffering housing, a lateral of the fixing barrel is provided with vent holes, a bottom side of the fixing barrel is disposed corresponding to a bottom side of the first flow-buffering housing, a limit ring extends at opposite sides of the bottom side of the fixing barrel and the bottom side of the first flow-buffering housing, a rubber plug slidable along an axial direction of the first flow-buffering housing is disposed at opposite sides of the fixing barrel and the first flow-buffering housing, a first spring is disposed at one side of the rubber plug, and the other side of the first spring is connected to an inner top side of the first flow-buffering housing.

Through the above design, the air enters the first flow-buffering housing from the air inlet channel and is temporarily stored in the first flow-buffering housing, and then is discharged into the shunt assembly from the air hole, and the flow-buffering assembly is used to buffer the air entering the air floating substrate. The rubber plug and the first spring are cooperatively disposed inside the first flow-buffering housing, wherein the rubber plug may slide and move along the axial direction of the first flow-buffering housing to realize cooperation of the rubber plug and the first spring. In this way, an airflow space inside the first flow-buffering housing may be controlled to further control an air pressure inside the first flow-buffering housing and an air pressure of the air discharged from the air hole, thereby avoiding loss or reduction of an air pressure value of the air in a long air pipe conveying process.

According to an embodiment of the present disclosure, a second flow-buffering housing is correspondingly disposed at a top side of the first flow-buffering housing, a partition plate is disposed between the top side of the first flow-buffering housing and the second flow-buffering housing, and a pressure-equalizing hole is disposed on the partition plate.

Through the above design, after the air enters the first flow-buffering housing, a part of the air will enter the second flow-buffering housing through the pressure-equalizing hole on the partition plate disposed at the top side of the first flow-buffering housing. The air inside the second flow-buffering housing is farther away from the air hole compared with the air inside the first flow-buffering housing, such that the air entering the second flow-buffering housing will be stored and buffered. When the air pressure of the external air source fluctuates, the rubber plug and the first spring inside the first flow-buffering housing may cooperate to ensure a stable pressure intensity in the first flow-buffering housing, and simultaneously, the second flow-buffering housing only having the pressure-equalizing hole connected to the first flow-buffering housing may further realize a stable pressure intensity of the air when a change of the pressure intensity of the air inside the first flow-buffering housing results in flow of the air inside the second flow-buffering housing. When the external air source stops supplying the air, the air inside the first flow-buffering housing will flow out in priority, and then, the air inside the second flow-buffering housing will be discharged into the shunt assembly. In this process, when the air-bearing table is pressed down due to gravity and generates a pressure on the magnetic preloading air bearing, the pressure can be buffered through the first flow-buffering housing and the second flow-buffering housing by use of the air therein, which is actually an effect similar to an air spring.

According to an embodiment of the present disclosure, the shunt assembly includes an annular filter sleeve, wherein a first base ring is coaxially spaced outside the annular filter sleeve, a plurality of first filter plates extending radially are disposed around the annular filter sleeve, the first filter plates are disposed slantly and used to connect the annular filter sleeve and the first base ring, a second base ring is coaxially spaced outside the first base ring, and the first base ring and the second base ring are connected by a plurality of bearings; and a plurality of partitions are disposed in middle parts of the first base ring and the second base ring, the second base ring is fixedly disposed on the air floating substrate, and a circumferential direction of the second base ring is disposed corresponding to an inner side of the air floating structure.

Through the above design, the air flows into the shunt assembly from the annular filter sleeve, and will flow radially to the outside of the annular filter sleeve under the action of the annular filter sleeve. When the air flows through the first filter plate disposed slantly, the first filter plate will rotate under the action of the air and carry the annular filter sleeve and the first base ring to rotate during rotation. At this time, the first filter plate will further expand contact with the air. In this process, the air will be filtered by the annular filter sleeve and the first filter plate together, such that particles and impurities in the air are adsorbed, and the air is filtered and purified to prevent part of the air floating structure from being blocked subsequently. Simultaneously, interception of the particles in the air can reduce an impact of the particles on a surface of the air floating guide rail along with an impact of high-speed airflow, thereby preventing problems of causing surface abrasion of the air floating guide rail and reducing surface roughness of the air floating guide rail. In addition, the first filter plate is used to drive the first base ring to rotate, so as to form airflow swirling outward. The swirling airflow formed in this way can improve the smoothness of airflow discharge and guide the airflow in a direction of the flow-buffering assembly in an upper part to flow outward, thereby avoiding the unsmoothness of the entire air conveying path. Further, the swirling airflow plays a role in air dispersion and ensures existence of an effective air film or pressure between a direct lower part of the air floating substrate and the air floating guide rail.

Further, the annular filter sleeve is disposed corresponding to the air inlet channel, wherein the air inlet channel and the annular filter sleeve are disposed rotationally.

Further, the annular filter sleeve is disposed corresponding to the flow-buffering assembly, and a plurality of bearings are disposed in a circumferential direction of the flow-buffering assembly to allow the annular filter sleeve to rotate due to cooperation with the annular filter sleeve.

According to an embodiment of the present disclosure, a plurality of hollow cavities are formed in the partitions in the middle parts of the first base ring and the second base ring, and second filter plates are disposed in the hollow cavities.

Through the above design, the second filter plate disposed in the hollow cavity may filter the air when the air enters the air floating structure from the shunt assembly. Simultaneously, the second filter plate located on the first base ring may allow the first base ring to rotate. During rotation, the air may be filtered in a larger range and subjected to cutting treatment, such that the air may enter the air floating structure with small airflow. The cutting treatment for the air can improve uniformity of the air when entering the air floating structure, that is, uniformity of an air pressure and uniformity of an air velocity, thereby improving the uniformity of the air film formed when the air floating structure receives the air, preventing the air hammer phenomenon, and preventing the air floating structure from being damaged due to the uneven air pressure at the same time.

The present disclosure provides a linear platform to cooperate with the above magnetic preloading air bearing. The linear platform includes a load-bearing table and an air-bearing table, wherein the load-bearing table includes a plurality of air floating guide rails, the air-bearing table is disposed corresponding to the plurality of air floating guide rails, and a plurality of magnetic preloading air bearings are uniformly disposed at a side of the air-bearing table relative to the air floating guide rails.

According to an embodiment of the present disclosure, a plurality of positioning holes are disposed on the air-bearing table, assembly members are disposed in cooperation with the positioning holes, and the positioning holes achieve a fixed connection of the magnetic preloading air bearing to the air-bearing table through the assembly members.

Through the above design, a plurality of magnetic preloading air bearings uniformly disposed at a side of the air-bearing table relative to the air floating guide rails can generate air films in a plurality of positions, thereby improving the stability of the air-bearing table.

Numerals of the drawings are described as follows: air floating substrate 1, air floating structure 11, air inlet channel 12, preloading assembly 2, magnet 21, limit column 211, third sliding groove 212, fixing rod 22, first frame 23, first sliding groove 231, fixing sleeve 232, sliding rod 233, rotary member 234, deceleration groove 235, indentation 236, convex strip 237, second frame 24, limit plate 241, second sliding groove 242, shunt assembly 3, annular filter sleeve 31, first base ring 32, second base ring 33, bearing 34, second filter plate 35, flow-buffering assembly 4, first flow-buffering housing 41, air hole 411, fixing barrel 412, limit ring 413, rubber plug 414, first spring 415, vent hole 416, second flow-buffering housing 42, partition plate 43, pressure-equalizing hole 44, air-bearing table 5, positioning hole 51, assembly member 52, and air floating guide rail 61.

DESCRIPTION OF EMBODIMENTS

The technical solution of the present disclosure will be further described below in detail in conjunction with specific embodiments and accompanying drawings.

Embodiment 1

As shown in FIGS. 1-6, a magnetic preloading air bearing includes an air floating substrate 1, wherein a plurality of preloading assemblies 2 are disposed around the air floating substrate 1, an annular air floating structure 11 extends and protrudes at one side of the air floating substrate 1, an air inlet channel 12 penetrates and extends at the other side of the air floating substrate 1, a shunt assembly 3 is disposed inside the air floating substrate 1, a side edge of the shunt assembly 3 is disposed corresponding to an inner side of the air floating structure 11, and the air inlet channel 12 is disposed corresponding to the shunt assembly 3; and the preloading assembly 2 is connected to the air floating substrate 1 through a fixing rod 22.

Figure 1:
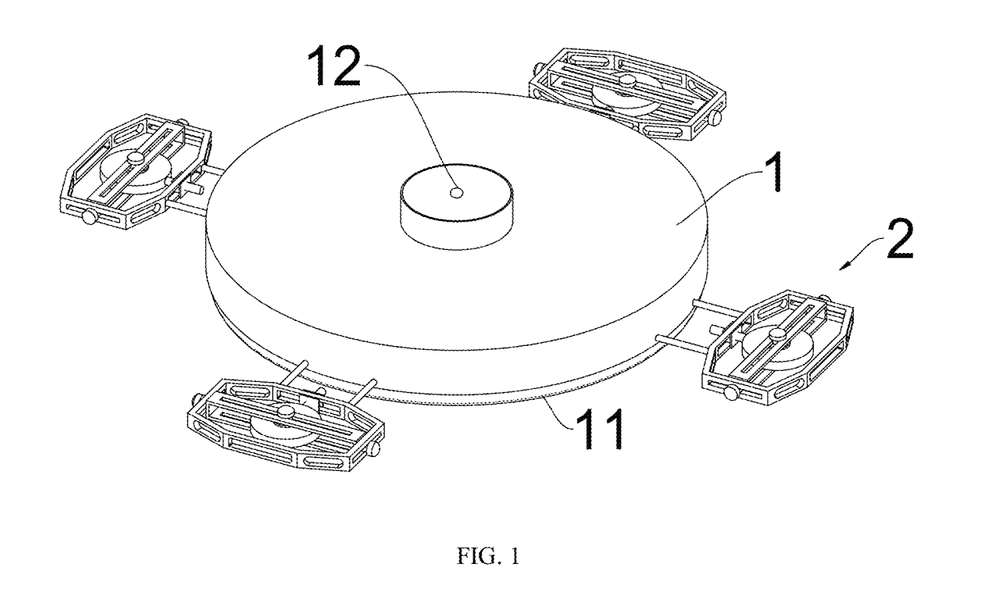
FIG. 1 is a three-dimensional schematic view of a magnetic preloading air bearing.
Figure 2:
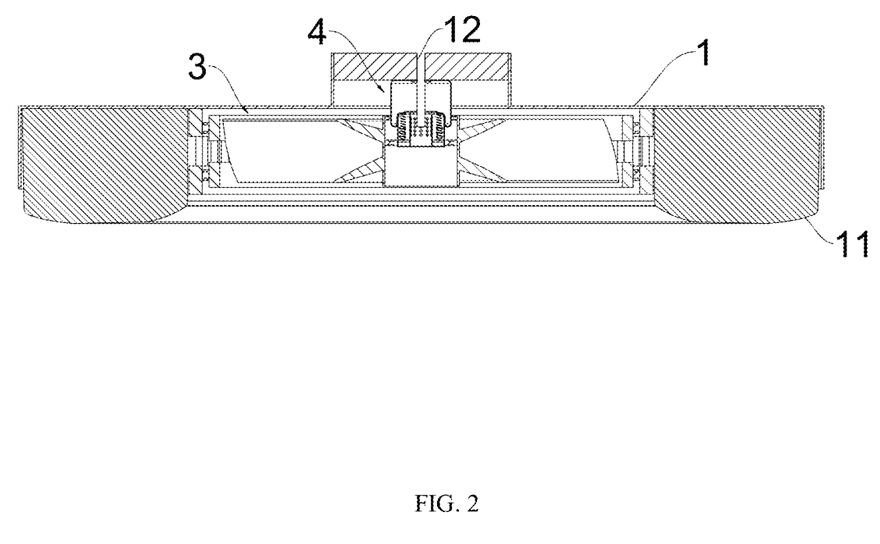
FIG. 2 is a partial sectional schematic view of an air floating substrate.

The air floating structure 11 adopts a porous throttle material.

With the overall arrangement of the magnetic preloading air bearing, an external air source will enter the air floating substrate 1 through the air inlet channel 12, and the air conveyed in the air inlet channel 12 will enter the shunt assembly 3. The shunt assembly 3 is used to achieve air shunt in two directions, one direction faces the air floating structure 11, and the other direction faces an air floating guide rail 61. The air floating structure 11 adopts the porous throttle material comprising a solid matrix and interconnected pores therein, the air will be throttled by the porous throttle material and flow between the porous throttle material and the air floating guide rail 61, and an air film is formed between the porous throttle material and the air floating guide rail 61 to achieve suspension of the air floating guide rail 61 and the porous throttle material. Since the air floating structure 11 is an annular structure protruding from a side of the air floating substrate 1, a groove may be provided at a side of the air floating substrate 1, that is, the shunt assembly 3 discharges the air toward the air floating guide rail 61 in the groove, thereby maintaining an air pressure and allowing the air pressure to have a certain elastic range. That is, when the external air source conveys the air and the air pressure fluctuates, the air may be stored and released in the groove to realize a stable pressure of the pressure fluctuation of the air in the groove and form the air film without affecting a thickness, thereby preventing the air hammer phenomenon. By disposing the shunt assembly 3, a plurality of air discharge directions may be formed to facilitate discharging the air to the outside and improving the smoothness of air discharge.

A plurality of preloading assemblies 2 are disposed around the air floating substrate 1, a magnet is disposed on the preloading assembly 2, and the preloading assembly 2 is used to cooperate with the air floating guide rail 61. That is, an adsorption strip or another magnetic adsorption device adapted to the preloading assembly 2 is disposed in a position opposite to the air floating guide rail 61. When the magnetic preloading air bearing travels, there may be an unstable condition in an operation process of the magnetic preloading air bearing, for example, the air bearing shakes or slants, the preloading assemblies 2 disposed around the air floating substrate assist in promoting the stability of the magnetic preloading air bearing during operation through magnetic adsorption, by forming an acting force with the air floating guide rail 61 through magnetic adsorption. When the external air source stops supplying air, the disposed preloading assembly 2 can be quickly adsorbed with the air floating guide rail 61 to stop a movement of an air-bearing table 5, thereby reducing or avoiding a movement error and improving the response efficiency and speed of braking.

Figure 3:
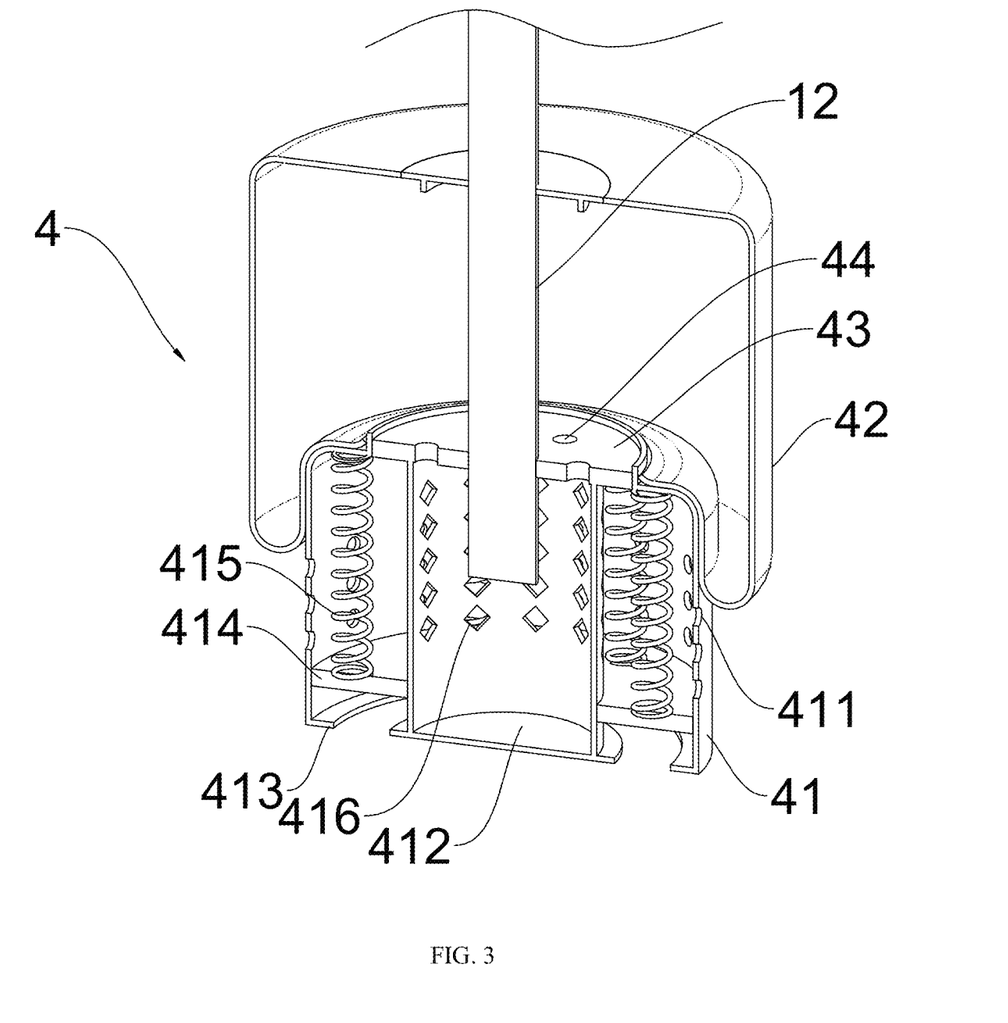
FIG. 3 is a sectional schematic view of a flow-buffering assembly.
Figure 4:
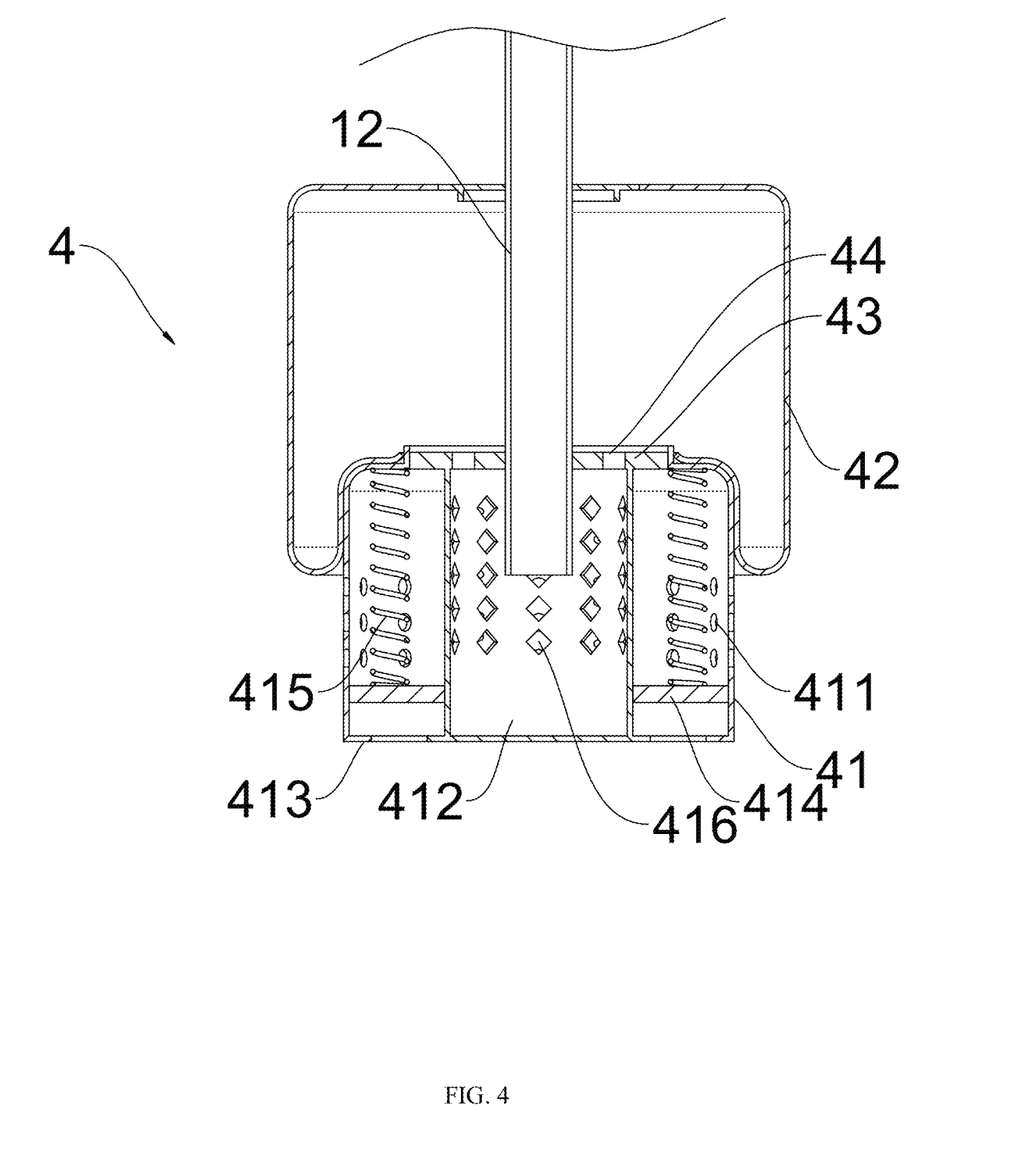
FIG. 4 is a schematic diagram of a flow-buffering assembly from another angle.

A flow-buffering assembly 4 is disposed at an end of the air inlet channel 12 to cooperate with the shunt component 3. The flow-buffering assembly 4 includes a first flow-buffering housing 41, the end of the air inlet channel 12 penetrates through a top of the first flow-buffering housing 41, and a lateral of the first flow-buffering housing 41 is surrounded by air holes 411; and a fixing barrel 412 is coaxially disposed inside the first flow-buffering housing 41, a lateral of the fixing barrel 412 is provided with vent holes 416, a bottom side of the fixing barrel 412 is disposed corresponding to a bottom side of the first flow-buffering housing 41, a limit ring 413 extends at opposite sides of the bottom side of the fixing barrel 412 and the bottom side of the first flow-buffering housing 41, a rubber plug 414 slidable along an axial direction of the first flow-buffering housing 41 is disposed at opposite sides of the fixing barrel 412 and the first flow-buffering housing 41, a first spring 415 is disposed at a side of the rubber plug 414, and the other side of the first spring 415 is connected to an inner top side of the first flow-buffering housing 41.

Through the above design, the air enters the first flow-buffering housing 41 from the air inlet channel 12 and is temporarily stored in the first flow-buffering housing 41, and then is discharged into the shunt assembly 3 from the air hole 411, and the flow-buffering assembly 4 is used to buffer the air entering the air floating substrate 1. The rubber plug 414 and the first spring 415 are cooperatively disposed inside the first flow-buffering housing 41, wherein the rubber plug 414 may slide and move along the axial direction of the first flow-buffering housing 41 to realize cooperation of the rubber plug 414 and the first spring 415. In this way, an airflow space inside the first flow-buffering housing 41 may be controlled to further control an air pressure inside the first flow-buffering housing 41 and an air pressure of the air discharged from the air hole 411, thereby avoiding loss or reduction of an air pressure value of the air in a long air pipe conveying process. A connecting base member is connected to a top side of the flow-buffering assembly 4, and used to be fixedly connected to the air floating substrate 1.

A second flow-buffering housing 42 is correspondingly disposed at a top side of the first flow-buffering housing 41, a partition plate 43 is disposed between the top side of the first flow-buffering housing 41 and the second flow-buffering housing, and a pressure-equalizing hole 44 is disposed on the partition plate 43.

Through the above design, after the air enters the first flow-buffering housing 41, a part of the air will enter the second flow-buffering housing 42 through the pressure-equalizing hole 44 on the partition plate 43 disposed at the top side of the first flow-buffering housing 41. The air inside the second flow-buffering housing 42 is farther away from the air hole 411 compared with the air inside the first flow-buffering housing 42, such that the air entering the second flow-buffering housing 42 will be stored and buffered. When the air pressure of the external air source fluctuates, the rubber plug 414 and the first spring 415 inside the first flow-buffering housing 41 may cooperate to ensure a stable pressure intensity in the first flow-buffering housing 41, and simultaneously, the second flow-buffering housing 42 only having the pressure-equalizing hole connected to the first flow-buffering housing 41 may further realize a stable pressure intensity of the air when a change of the pressure intensity of the air inside the first flow-buffering housing 41 results in flow of the air inside the second flow-buffering housing 42. When the external air source stops supplying the air, the air inside the first flow-buffering housing 41 will flow out in priority, and then, the air inside the second flow-buffering housing 42 will be discharged into the shunt assembly 3. In this process, when the air-bearing table 5 is pressed down due to gravity and generates a pressure on the magnetic preloading air bearing, the pressure can be buffered through the first flow-buffering housing 41 and the second flow-buffering housing 42 by use of the air therein, which is actually an effect similar to an air spring.

Figure 5:
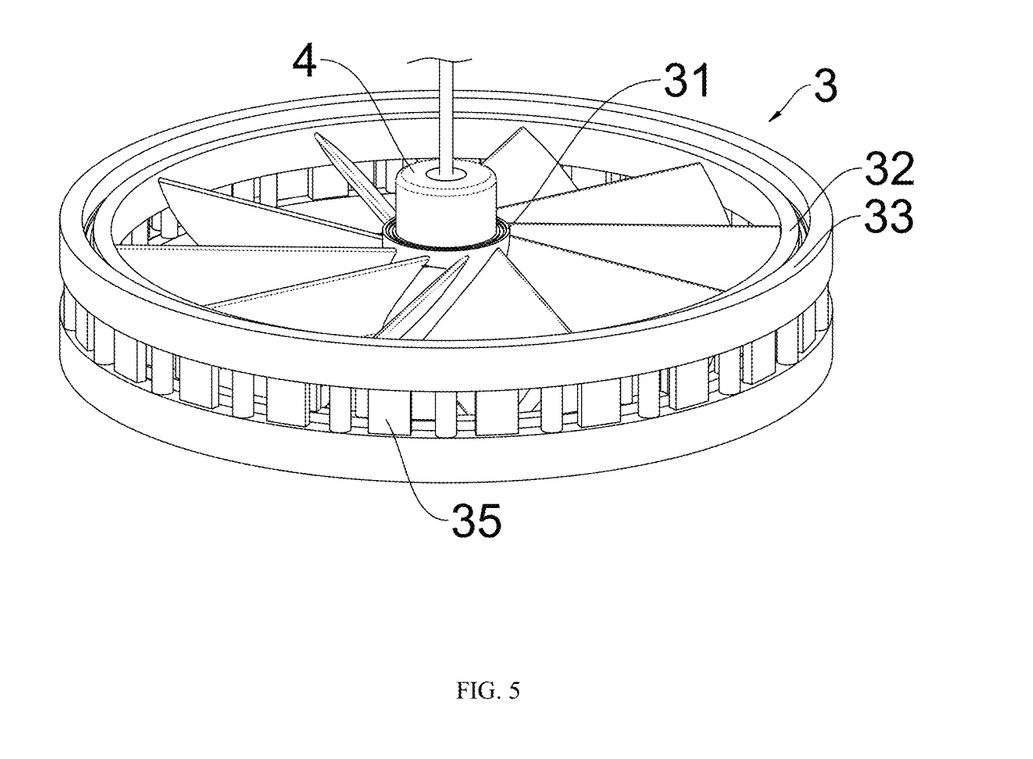
FIG. 5 is a schematic diagram of cooperation between a shunt assembly and a flow-buffering assembly.
Figure 6:
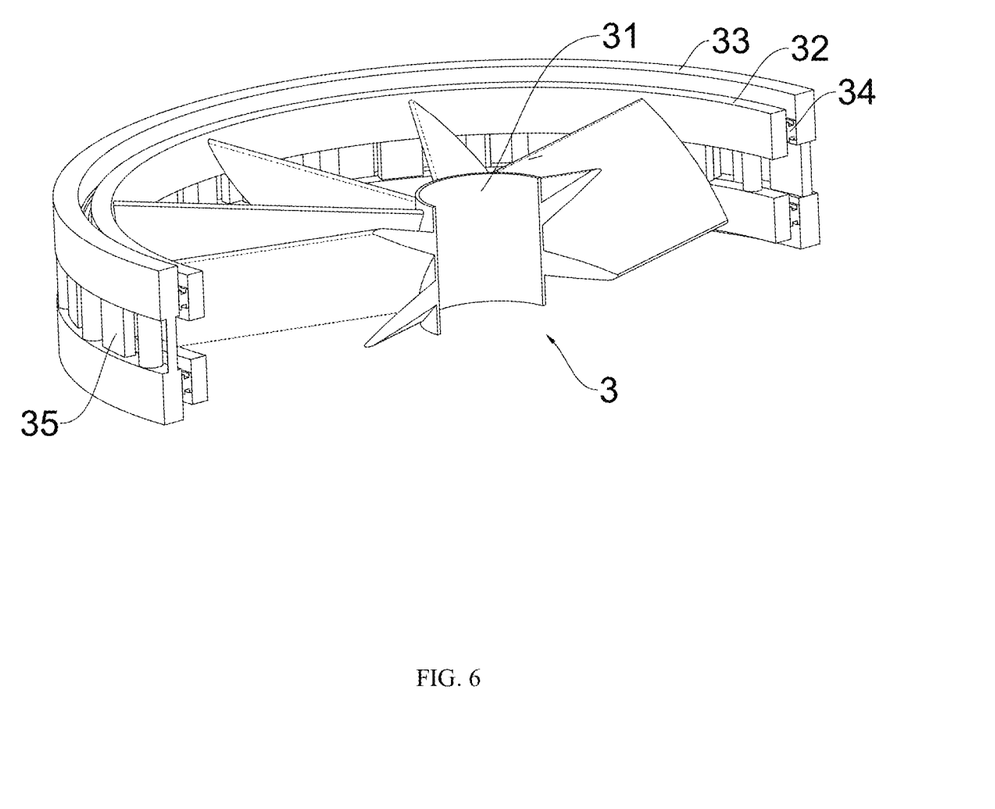
FIG. 6 is a sectional schematic view of a shunt assembly.

The shunt assembly 3 includes an annular filter sleeve 31, wherein a first base ring 32 is coaxially spaced outside the annular filter sleeve 31, a plurality of first filter plates extending radially are disposed around the annular filter sleeve 31, the first filter plates are disposed slantly and used to connect the annular filter sleeve 31 and the first base ring 32, a second base ring 33 is coaxially spaced outside the first base ring 32, and the first base ring 32 and the second base ring 33 are connected by a plurality of bearings 34; and a plurality of partitions are disposed in middle parts of the first base ring 32 and the second base ring 33, the second base ring 33 is are fixedly disposed on the air floating substrate 1, and a circumferential direction of the second base ring 33 is disposed corresponding to an inner side of the air floating structure 11.

Through the above design, the air flows into the shunt assembly 3 from the annular filter sleeve 31, and will flow radially to the outside of the annular filter sleeve 31 under the action of the annular filter sleeve 31. When the air flows through the first filter plate disposed slantly, the first filter plate will rotate under the action of the air and carry the annular filter sleeve 31 and the first base ring 32 to rotate during rotation. At this time, the first filter plate will further expand contact with the air. In this process, the air will be filtered by the annular filter sleeve 31 and the first filter plate together, such that particles and impurities in the air are adsorbed, and the air is filtered and purified to prevent part of the air floating structure 11 from being blocked subsequently. Simultaneously, interception of the particles in the air can reduce an impact of the particles on a surface of the air floating guide rail 61 along with an impact of high-speed airflow, thereby preventing problems of causing surface abrasion of the air floating guide rail 61 and reducing surface roughness of the air floating guide rail 61. In addition, the first filter plate is used to drive the first base ring 32 to rotate, so as to form airflow swirling outward. The swirling airflow formed in this way can improve the smoothness of airflow discharge and guide the airflow in a direction of the flow-buffering assembly 4 in an upper part to flow outward, thereby avoiding the unsmoothness of the entire air conveying path. Further, the swirling airflow plays a role in air dispersion and ensures existence of an effective air film or pressure between a direct lower part of the air floating substrate 1 and the air floating guide rail 61.

Further, the annular filter sleeve 31 is disposed corresponding to the air inlet channel 12, wherein the air inlet channel 12 and the annular filter sleeve 31 are disposed rotationally.

Further, the annular filter sleeve 31 is disposed corresponding to the flow-buffering assembly 4, and a plurality of bearings 34 are disposed in a circumferential direction of the flow-buffering assembly 4 to allow the annular filter sleeve 31 to rotate due to cooperation with the annular filter sleeve 31.

A plurality of hollow cavities are formed in the partitions in the middle parts of the first base ring 32 and the second base ring 33, and second filter plates 35 are disposed in the hollow cavities.

Through the above design, the second filter plate 35 disposed in the hollow cavity may filter the air when the air enters the air floating structure 11 from the shunt assembly 3. Simultaneously, the second filter plate 35 located on the first base ring 32 may allow the first base ring 32 to rotate. During rotation, the air may be filtered in a larger range and subjected to cutting treatment, such that the air may enter the air floating structure 11 with small airflow. The cutting treatment for the air can improve uniformity of the air when entering the air floating structure 11, that is, uniformity of an air pressure and uniformity of an air velocity, thereby improving the uniformity of the air film formed when the air floating structure 11 receives the air, preventing the air hammer phenomenon, and preventing the air floating structure 11 from being damaged due to the uneven air pressure at the same time.

Embodiment 2

Figure 7:
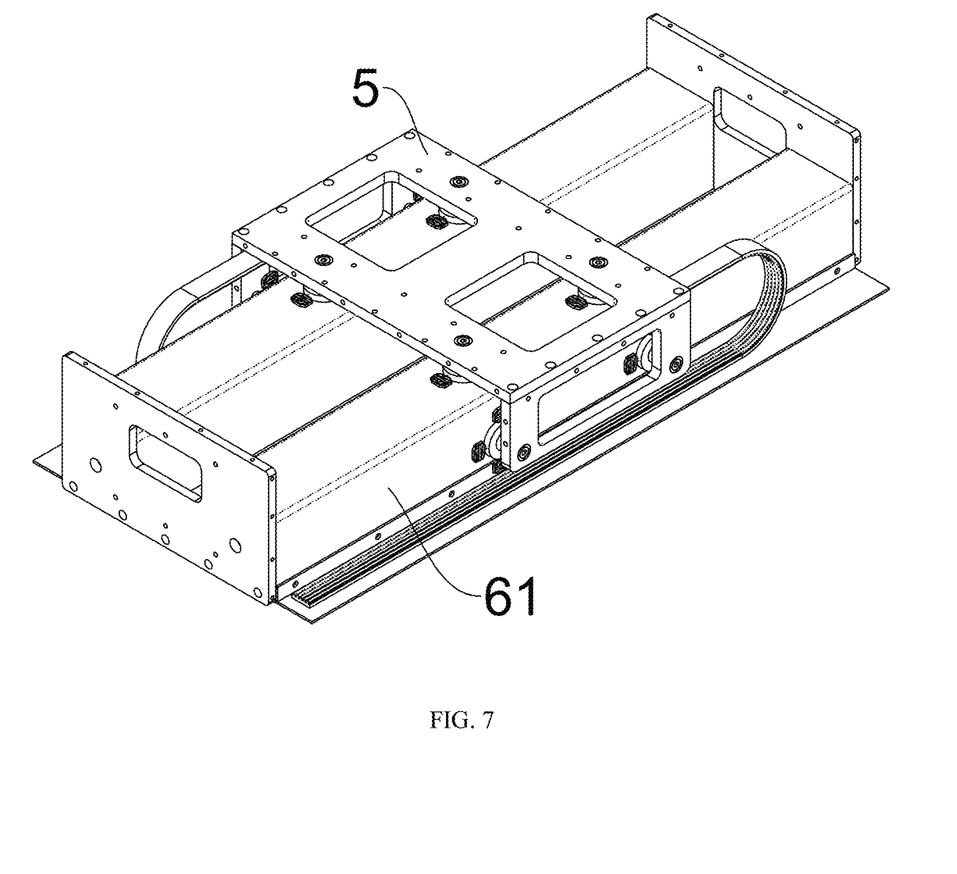
FIG. 7 is a three-dimensional schematic view of a linear platform.
Figure 8:
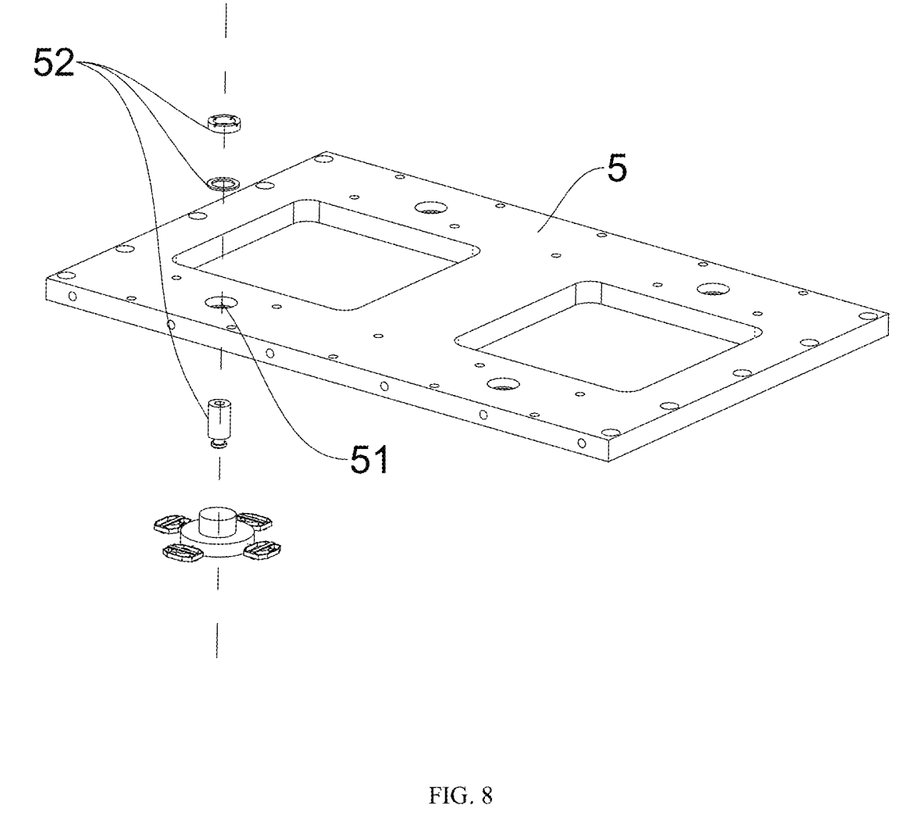
FIG. 8 is a schematic diagram of cooperation between an air-bearing table and a magnetic preloading air bearing.

FIG. 7 and FIG. 8 show a linear platform according to an embodiment of the present disclosure. The linear platform is used to cooperate with the above magnetic preloading air bearing. The linear platform includes a load-bearing table and an air-bearing table 5, wherein the load-bearing table includes a plurality of air floating guide rails 61, the air-bearing table 5 is disposed corresponding to the plurality of air floating guide rails 61, and a plurality of magnetic preloading air bearings are uniformly disposed at a side of the air-bearing table 5 relative to the air floating guide rails 61.

A plurality of positioning holes 51 are disposed on the air-bearing table 5, assembly members 52 are disposed in cooperation with the positioning holes 51, and the positioning holes 51 achieve a fixed connection of the magnetic preloading air bearing to the air-bearing table 5 through the assembly members 52.

Through the above design, a plurality of magnetic preloading air bearings uniformly disposed at a side of the air-bearing table 5 relative to the air floating guide rails 61 can generate air films in a plurality of positions, thereby improving the stability of the air-bearing table 5. Further, adsorption strips corresponding to the magnetic preloading air bearings are disposed on the plurality of air floating guide rails 61 to cooperate with the magnetic preloading air bearings. Further, the plurality of air floating guide rails 61 are magnetic substances.

Further, the assembly member 52 may be connected to an air pipe, and the air pipe may supply the air to the magnetic preloading air bearing.

Embodiment 3

Figure 9:
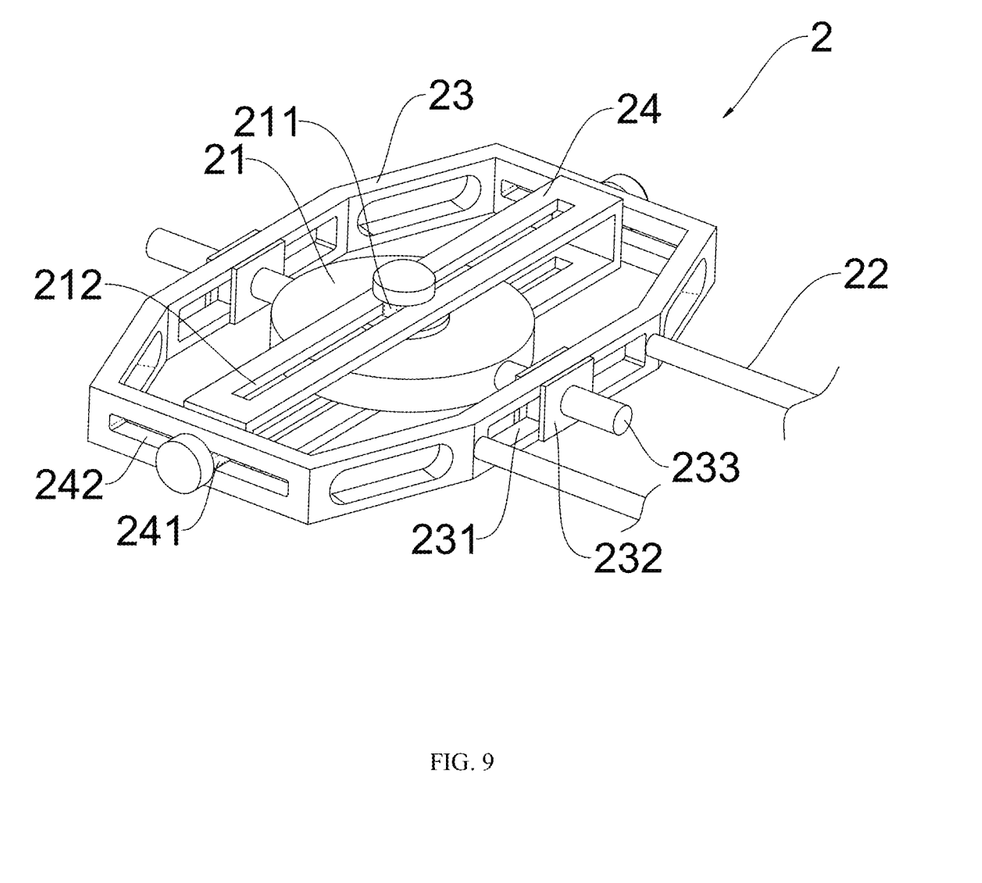
FIG. 9 is a three-dimensional schematic view of a preloading assembly.
Figure 10:
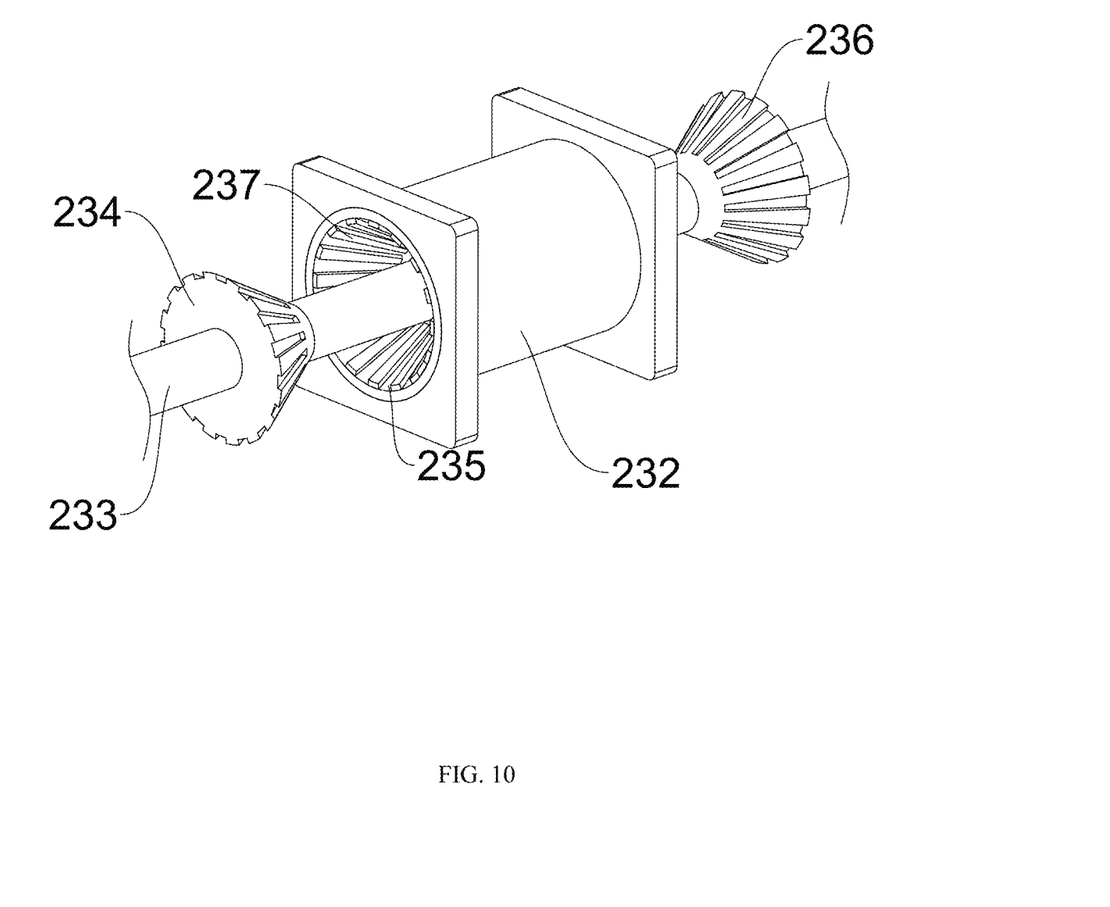
FIG. 10 is a schematic diagram of cooperation between a fixing sleeve and a sliding rod.
Figure 11:
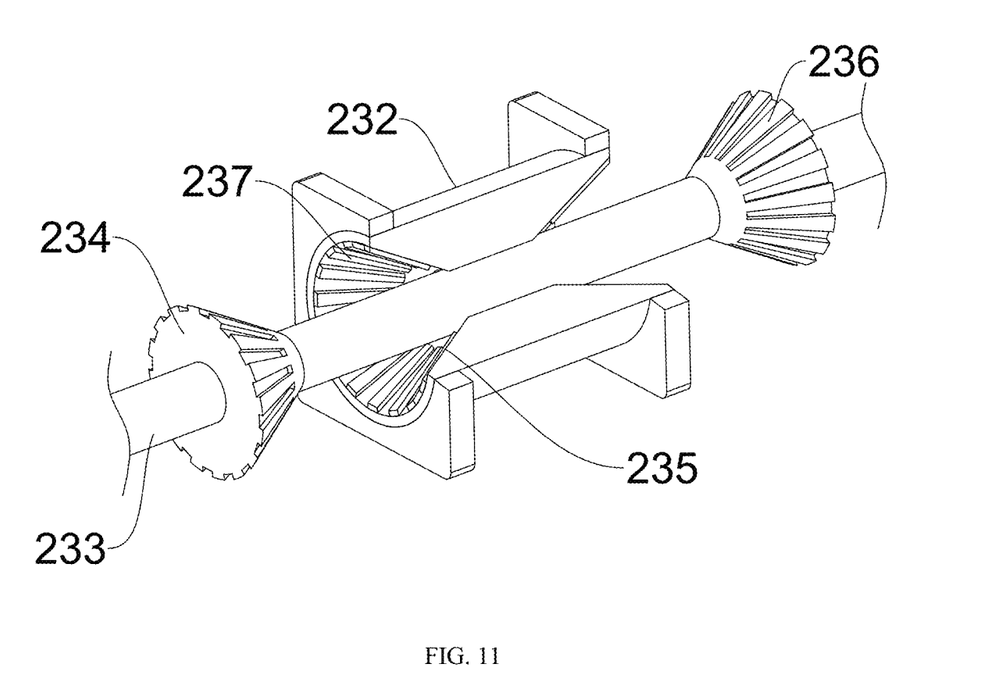
FIG. 11 is a sectional schematic view of a fixing sleeve and a sliding rod.

FIGS. 9-11 show a magnetic preloading air bearing according to another embodiment of the present disclosure. This embodiment is different from Embodiment 1 in that, the preloading assembly 2 includes a magnet 21, a first frame 23 and a second frame 24, wherein the magnet 21 is received in the second frame 24, the second frame 24 is received in the first frame 23, a plane of the first frame 23 is perpendicular to a plane of the second frame 24, a first sliding groove 231 is disposed at opposite sides of one side of the first frame 23, respectively, a fixing sleeve 232 is slidably and cooperatively disposed on the first sliding groove 231, a sliding rod 233 penetrates through the fixing sleeve 232, and an end of the sliding rod 233 is connected to the magnet 21; and a limit plate 241 is disposed at both sides of the second frame 24, respectively, a second sliding groove 242 is disposed at two opposite sides of the other side of the first frame 23, respectively, the second sliding groove 242 is disposed in cooperation with the limit plate 241, a limit column 211 is disposed at both sides of the magnet 21, respectively, a third sliding groove 212 is disposed at both sides of the second sliding groove relative to the magnet 21, respectively, the third sliding groove 212 is disposed in cooperation with the limit column 211, and a fixing rod 22 is connected to the first frame 23.

Through the above design, the magnet 21 can slide relative to the first frame 23 and the second frame 24, that is, a distance between the magnet 21 and the air floating substrate 1 can be controlled by disposing the slidable magnet 21, thereby automatically adjusting a magnetic adsorption range according to a velocity/pressure of the air discharged from the air floating substrate 1. The arrangement of the first frame 23 and the second frame 24 facilitates protecting a periphery of the air floating substrate 1. When the air floating substrate 1 moves down due to gravity of the air-bearing table 5 and the preloading assembly 2 is adsorbed with the load-bearing table due to an attraction force of the magnet 21, the second frame 24 contacts the air floating guide rail 61 to prevent the air floating substrate 1 of the air bearing from contacting the air floating guide rail 61, so as to protect the air floating substrate 1. It is to be noted that the first frame 23 and the second frame 24 are of a rubber structure to avoid frictional breakage due to contact with the air floating guide rail 61.

In addition, the preloading assembly 2 can further control a range of strong airflow discharged outward/around by the air floating substrate 1 to be in a range where the preloading assemblies 2 are disposed around the air floating substrate 1, that is, the pressure of the airflow in a circular region of the preloading assemblies 2 disposed around the air floating substrate 1 is stronger. Since the preloading assemblies 2 in the periphery achieve an interference effect on the airflow discharged outward, the pressure intensity of the airflow or the like outside this region is relatively low, thereby ensuring that the pressure intensity of the airflow or the pressure intensity of the air film of the air floating substrate 1 relative to the surface of the air floating guide rail 61 or a distance therebetween is in a stable range.

Rotary members 234 are oppositely disposed on a connecting rod. Two rotary members 234 are disposed at both sides of the fixing sleeve 232, respectively, opposite sides of the rotary members 234 are disposed slantly, a plurality of indentations 236 are circumferentially disposed at the opposite sides of the rotary members 234, deceleration grooves 235 are disposed at both ends of the fixing sleeve 232, the deceleration grooves 235 are disposed corresponding to the rotary members 234, and convex strips 237 disposed in cooperation with the indentations 236 are disposed at a side of the deceleration grooves 235 opposite to the rotary members 234.

Through the above design, when the rotary member 234 is not in contact with the fixing sleeve 232, the connecting rod may move relative to the fixing sleeve 232, that is, the magnet 21 connected to the connecting rod may move freely along an axial direction of the connecting rod. When the rotary member 234 is in contact with the fixing sleeve 232, the indentation 236 on the rotary member 234 will be matched with the convex strip 237 on the deceleration groove 235 to lead the rotary member 234 to move, thereby limiting a sliding distance of the magnet 21. By controlling the sliding distance, the precision of the preloading assembly 2 can be improved. Simultaneously, by contacting the rotary member 234 with the fixing sleeve 232, an inertial force of the magnet 21 can be absorbed.

The technical solution of the present disclosure is described in detail through the above embodiments. It should be understood that the above embodiments are only specific embodiments of the present disclosure and are not intended to limit the present disclosure. Any modification, supplement or similar substitution made within the scope of principles of the present disclosure should be included in the scope of protection of the present disclosure.

What is claimed is:

1. A magnetic preloading air bearing, comprising an air floating substrate (1), wherein a plurality of preloading assemblies (2) are disposed around the air floating substrate (1), an annular air floating structure (11) extends and protrudes at one side of the air floating substrate (1), an air inlet channel (12) penetrates and extends at another side of the air floating substrate (1), a shunt assembly (3) is disposed inside the air floating substrate (1), a side edge of the shunt assembly (3) is disposed corresponding to an inner side of the air floating structure (11), the air inlet channel (12) is disposed corresponding to the shunt assembly (3), a flow-buffering assembly (4) is disposed at an end of the air inlet channel (12), and the flow-buffering assembly (4) is disposed in cooperation with the shunt assembly (3);

the shunt assembly (3) comprises an annular filter sleeve (31), a first base ring (32) is coaxially spaced outside the annular filter sleeve (31), a second base ring (33) is coaxially spaced outside the first base ring (32), the second base ring (33) is fixedly disposed on the air floating substrate (1), and a circumferential direction of the second base ring (33) is disposed corresponding to the inner side of the air floating structure (11);

the plurality of preloading assemblies (2) are connected to the air floating substrate (1) through a fixing rod (22);

each of the plurality of preloading assemblies (2) comprises a magnet (21), a first frame (23) and a second frame (24), the magnet (21) is received in the second frame (24), the second frame (24) is received in the first frame (23), a plane of the first frame (23) is perpendicular to a plane of the second frame (24), a first sliding groove (231) is disposed at opposite sides of one side of the first frame (23), respectively, a fixing sleeve (232) is slidably and cooperatively disposed on the first sliding groove (231), a sliding rod (233) penetrates through the fixing sleeve (232), and an end of the sliding rod (233) is connected to the magnet (21); and a limit plate (241) is disposed at two sides of the second frame (24), respectively, a second sliding groove (242) is disposed at two opposite sides of another side of the first frame (23), respectively, the second sliding groove (242) is disposed in cooperation with the limit plate (241), a limit column (211) is disposed at both sides of the magnet (21), respectively, a third sliding groove (212) is disposed at both sides of the second sliding groove relative to the magnet (21), respectively, the third sliding groove (212) is disposed in cooperation with the limit column (211), and the fixing rod (22) is connected to the first frame (23).

2. The magnetic preloading air bearing according to claim 1, wherein the flow-buffering assembly (4) comprises a first flow-buffering housing (41), the end of the air inlet channel (12) penetrates through a top of the first flow-buffering housing (41), and a lateral of the first flow-buffering housing (41) is surrounded by air holes (411); and a fixing barrel (412) is coaxially disposed inside the first flow-buffering housing (41), a lateral of the fixing barrel (412) is provided with vent holes (416), a bottom side of the fixing barrel (412) is disposed corresponding to a bottom side of the first flow-buffering housing (41), a limit ring (413) extends at opposite sides of the bottom side of the fixing barrel (412) and the bottom side of the first flow-buffering housing (41), a rubber plug (414) slidable along an axial direction of the first flow-buffering housing (41) is disposed at opposite sides of the fixing barrel (412) and the first flow-buffering housing (41), a first spring (415) is disposed at one side of the rubber plug (414), and the other side of the first spring (415) is connected to an inner top side of the first flow-buffering housing (41).

3. The magnetic preloading air bearing according to claim 2, wherein a second flow-buffering housing (42) is correspondingly disposed at a top side of the first flow-buffering housing (41), a partition plate (43) is disposed between the top side of the first flow-buffering housing (41) and the second flow-buffering housing, and a pressure-equalizing hole (44) is disposed on the partition plate (43).

4. The magnetic preloading air bearing according to claim 1, wherein a plurality of first filter plates extending radially are disposed around the annular filter sleeve (31), the plurality of first filter plates are disposed slantly and configured to connect the annular filter sleeve (31) and the first base ring (32), and the first base ring (32) and a second base ring (33) are connected by a plurality of bearings (34); and a plurality of partitions are respectively disposed in middle parts of the first base ring (32) and the second base ring (33).

5. The magnetic preloading air bearing according to claim 4, wherein a plurality of hollow cavities are formed in the plurality of partitions in the middle parts of the first base ring (32) and the second base ring (33), and second filter plates (35) are disposed in the hollow cavities.

6. The magnetic preloading air bearing according to claim 1, wherein the air floating structure (11) adopts a porous throttle material.

7. A linear platform having the magnetic preloading air bearing according to claim 1, wherein the linear platform comprises a load-bearing table and an air-bearing table (5), the load-bearing table comprises a plurality of air floating guide rails (61), the air-bearing table (5) is disposed corresponding to the plurality of air floating guide rails (61), and a plurality of magnetic preloading air bearings are uniformly disposed at a side of the air-bearing table (5) relative to the air floating guide rails (61).

8. The linear platform according to claim 7, wherein a plurality of positioning holes (51) are disposed on the air-bearing table (5), assembly members (52) are disposed in cooperation with the positioning holes (51), and the plurality of positioning holes (51) achieve a fixed connection of the magnetic preloading air bearing onto the air-bearing table (5) through the assembly members (52).

* * * * *